United States Patent
Kim et al.

(10) Patent No.: US 11,767,434 B2
(45) Date of Patent: Sep. 26, 2023

(54) COMPOSITION FOR A STAINLESS COATING, STAINLESS MEMBER INCLUDING THE STAINLESS COATING, AND METHOD OF MANUFACTURING SAME

(71) Applicant: LG ELECTRONICS INC., Seoul (KR)

(72) Inventors: Soyoon Kim, Seoul (KR); Dong Jin Kim, Seoul (KR); Juwon Kim, Seoul (KR); Hyunwoo Jun, Seoul (KR); Jaekyung Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 206 days.

(21) Appl. No.: 17/122,268

(22) Filed: Dec. 15, 2020

(65) Prior Publication Data
US 2021/0222012 A1    Jul. 22, 2021

(30) Foreign Application Priority Data
Jan. 16, 2020 (KR) .................. 10-2020-0006065

(51) Int. Cl.
*C09D 1/04* (2006.01)
*C09D 7/65* (2018.01)

(52) U.S. Cl.
CPC ............... *C09D 1/04* (2013.01); *C09D 7/65* (2018.01)

(58) Field of Classification Search
CPC .. C09D 1/04; C09D 7/65; C23C 22/62; C23C 22/74; C23C 22/76; C23C 2222/20;
(Continued)

(56) References Cited

U.S. PATENT DOCUMENTS

| 6,716,513 | B1 * | 4/2004 | Hasuo | .................. C04B 41/009 428/323 |
| 2002/0028288 | A1 * | 3/2002 | Rohrbaugh | .......... C11D 3/1253 427/372.2 |

(Continued)

FOREIGN PATENT DOCUMENTS

| CN | 108329727 | 7/2018 |
| EP | 3 395 920 | 10/2018 |

(Continued)

OTHER PUBLICATIONS

The Distilled Water Company: Uses of Distilled Water in Laboratories and Hospitals [online], [retrieved on Dec. 12, 2022], Retrieved from the internet: <URL: http://blog.thedistilledwatercompany.com/uses-of-distilled-water-in-laboratories-and-hospitals/> (Year: 2022).*

(Continued)

*Primary Examiner* — Stefanie J Cohen
*Assistant Examiner* — Ritu S Shirali
(74) *Attorney, Agent, or Firm* — KED & ASSOCIATES, LLP

(57) ABSTRACT

A composition for a stainless coating according to the present disclosure includes a sodium silicate, a lithium silicate, a polysiloxane, ethanol, and a residual solvent. The composition may be uniformly and smoothly coated on a curved, stainless steel surface, cleaning may be easier, and yellowing may be reduced or prevented.

7 Claims, 7 Drawing Sheets

Content increase of sodium silicate

(58) Field of Classification Search
CPC ........... C23C 24/08; C23C 30/00; B05D 1/02;
C08K 5/05; C08L 83/04
USPC ........................................................ 106/600
See application file for complete search history.

(56) References Cited

U.S. PATENT DOCUMENTS

| | | |
|---|---|---|
| 2002/0168477 A1 | 11/2002 | Savin |
| 2004/0050024 A1 | 3/2004 | Nishino et al. |
| 2020/0291240 A1 | 9/2020 | Keese et al. |

FOREIGN PATENT DOCUMENTS

| | | |
|---|---|---|
| WO | WO 02/085541 | 10/2002 |
| WO | WO 2017/160918 | 9/2017 |

OTHER PUBLICATIONS

European Search Report dated Mar. 11, 2021 issued in EP Application No. 21151191.0.

* cited by examiner

Content increase of sodium silicate

Content increase of polysiloxane

Stainless surface before cleaning olive oil | Comparative Example 1

Stainless surface before cleaning olive oil

Example 1

Stainless surface before cleaning chicken's oil

Comparative Example 1

Stainless surface before cleaning chicken's oil

Example 1

Example 1

Comparative Example 1

Example 1

Example 1

COMPOSITION FOR A STAINLESS COATING, STAINLESS MEMBER INCLUDING THE STAINLESS COATING, AND METHOD OF MANUFACTURING SAME

CROSS-REFERENCE TO RELATED APPLICATION(S)

The present disclosure claims priority to and the benefit of Korean Patent Application No. 10-2020-0006065, filed in Korea on Jan. 16, 2020, the disclosure of which is incorporated herein by reference in its entirety.

BACKGROUND

1. Field

The present disclosure relates to a composition for stainless coating, a stainless member including a coating layer, and a method of manufacturing the same.

2. Background

Stainless steel is often used for metal objects such as cooking appliances (e.g., a gas range or a light wave oven). Stainless steel may have a pleasing appearance and may be used without any additional surface treatment to maintain a shiny and clean feeling. However, contaminants incurred during cooking may adhere to a stainless steel surface when exposed to a high temperature. The contaminants may not easily wash out, causing inconvenience.

When exposed to high temperatures for a long time, the stainless steel surface may turn yellow. A stainless or protective coating including a chrome passive film may be formed on the stainless steel surface to prevent moisture permeability of ambient air so that oxygen may not permeate the stainless coating, and so that yellowing may not occur at a room temperature. However, when exposed to high temperatures of 250° C. or more for a long time, such a chrome layer stainless coating may be denaturalized, and cracks may occur. Oxygen may permeate gaps among cracks of the stainless coating to form iron oxide, which causes yellowing.

The stainless coating may include a glass component so as to remove contaminants fixed to the stainless surface and prevent yellow. However, when exposed to water for a long time, positive ions in the glass may move or be lost, causing the stainless coating to roughen. In addition, whitening may occur when the glass component is combined with moisture in the air.

The stainless surface may be coated by dip coating or roll coating with the stainless coating, but curved surfaces of the stainless surface may not be uniformly coated. In order to uniformly coat curved surfaces, the stainless coating may be sprayed onto the stainless surface, but such an application may not be smooth depending on a particle size.

BRIEF DESCRIPTION OF THE DRAWINGS

Embodiments will be described in detail with reference to the following drawings in which like reference numerals refer to like elements, and wherein.

DETAILED DESCRIPTION

Composition for a Stainless Coating or Coating Layer

A composition for a stainless coating or coating layer according to the present disclosure may include a sodium silicate, a lithium silicate, a polysiloxane, ethanol ($C_2H_6O$), and a residual solvent. Sodium silicate is a name for inorganic sodium salts having silicate as a counterion, such as sodium metasilicate ($Na_2SiO_3$). Sodium silicate has excellent heat resistance, so that stainless steel coated with a coating layer having a composition including sodium silicate may maintain its physical properties even at a high temperature of 400° C. or more.

Sodium silicate has a similar composition with that of glass and exhibits low air penetrability and transparency or translucency. Stainless steel coated with a coating layer including sodium silicate may reduce or prevent oxygen from permeating the stainless surface and thus may reduce or prevent yellowing. The stainless steel coated with such a coating layer may have a shiny and clean feeling and aesthetic.

Figure 1:
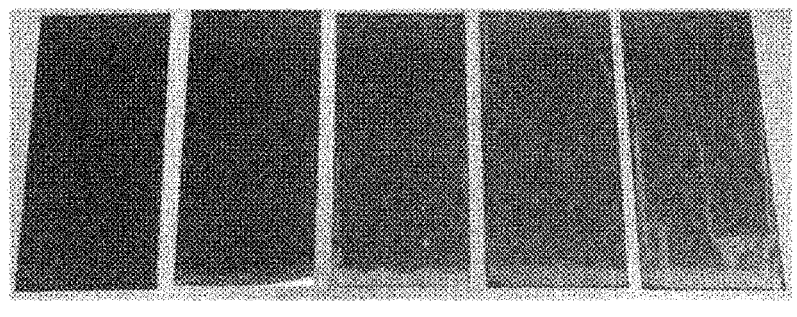
FIG. 1 shows whitening of a stainless coating or coating layer according to an increase in sodium silicate within a composition of the stainless coating.

The composition of the coating layer according to the present disclosure may include sodium silicate in a range of 5 to 20 weight percent (wt %). If sodium silicate is included in an amount of less than 5 wt %, cracks in the coating layer may occur during the coating process and powdering may occur, preventing formation of the coating layer. If sodium silicate is included in an amount of more than 20 wt %, moisture resistance of the coating layer may be lowered, and whitening caused by moisture in room temperature air may occur. FIG. 1 shows various surfaces treated with coating layers having increasing amounts of sodium silicate and hardened. Referring to FIG. 1, as the content of sodium silicate is increased within the composition of the coating layer, an amount of solvent may be relatively reduced. The increased sodium silicate may react with carbon dioxide in the air, and whitening may occur.

The composition according to the present disclosure may also include lithium silicate. Lithium silicate or lithium metasilicate ($Li_2SiO_3$) is a kind of silicate and hardener. Lithium silicate has a better heat resistance than that of sodium silicate, and a coating layer having a composition including lithium silicate may enhance heat resistance.

Lithium silicate does not easily dissolve in moisture as compared to sodium silicate. A composition of a coating layer that includes lithium silicate may minimize or reduce whitening caused by moisture in room temperature air. Also, lithium silicate has a similar composition to that of glass and exhibits low air penetrability and transparency or translucency. Stainless steel coated with a coating layer having a composition that includes lithium silicate may prevent or reduce permeation of oxygen and thus may prevent or reduce yellowing, and the final stainless may have a shiny and clean feeling and aesthetic.

The composition according to the present disclosure may include lithium silicate in a range of 3 to 20 wt %. If lithium silicate is included in an amount of less than 3 wt %, due to a relatively increased amount of sodium silicate, moisture resistance at room temperature of the coating layer may be lowered, and whitening may occur. If lithium silicate is included in an amount of more than 20 wt %, due to a relatively reduced amount of sodium silicate, cracks in the coating layer may occur during a coating process and powdering may occur, which may interfere with or prevent formation of the coating layer.

Physical Properties of the composition according to the present disclosure may be changed according to a mole ratio of each of the sodium silicate and the lithium silicate. If the mole ratio of silicon dioxide to sodium oxide ($SiO_2/Na_2O$) of the sodium silicate and silicon dioxide to lithium oxide ($SiO_2/Li_2O$) of the lithium silicate are high, flexibility of the composition may be reduced. If a concentration of the sodium silicate and the lithium silicate is lowered to increase flexibility, the composition may be less solid and durable. To secure flexibility while maintaining a solid phase, the mole ratio of $SiO_2/Na_2O$ of the sodium silicate may be 3.9 to 4.1, and the mole ratio of $SiO_2/Li_2O$ of the lithium silicate may be 4.5 to 5.0.

Figure 2:
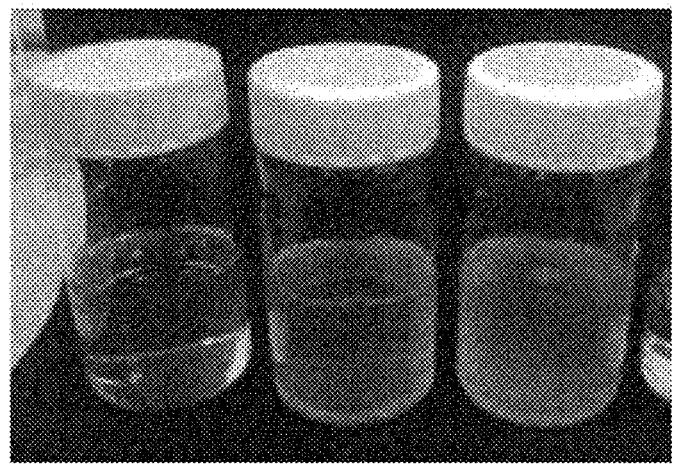
FIG. 2 shows turbidity according to an increase in polysiloxane within an unhardened composition.

The composition according to the present disclosure may also include a polysiloxane and ethanol to enhance leveling performance and ensure a smooth and uniform spray coating, even if the stainless steel surface is curved. The composition according to the present disclosure may include one wt % or less of a polysiloxane. If the polysiloxane exceeds one wt %, dispersibility of the polysiloxane may be reduced, floaters or suspended particles may occur, and a filtering process may be needed to remove any floaters, which may reduce quality and increase cost and time. Referring to FIG. 2, as the content of the polysiloxane increases within the composition, dispersibility of the polysiloxane is reduced, turbidity of the composition increases, and floaters occur, as shown by the murkier appearance of the composition.

Figure 3:
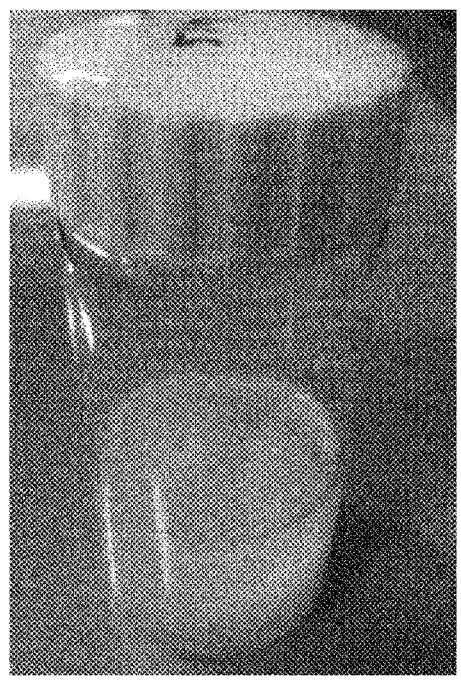
FIG. 3 represents gelation of an unhardened composition including more than 5 weight percent (wt %) of the ethanol.

The composition according to the present disclosure may include ethanol in a range of 5 wt % or less. If ethanol exceeds 5 wt %, stability of the composition may be lowered, gelation may occur during long-term storage, and industrial productivity may be reduced. FIG. 3 shows an unhardened coating layer having a composition including more than 5 wt % of ethanol. As shown in FIG. 3, the composition has a gel-like structure, which may be difficult to apply. The composition according to the present embodiment may further include a polysilazane or a silane to enhance leveling performance of the coating layer.

The composition according to the present disclosure may also include a residual solvent. The solvent may be prepared to properly mix the sodium silicate, the lithium silicate, the polysiloxane, and the ethanol and to satisfy the physical properties of the composition for the coating layer. Distilled water, an organic solvent, etc. may be used for the solvent. Distilled water may improve workability of the stainless coating process, and thickness may be easily controlled during manufacturing of the coating layer.

The solvent may be a residual product other than the sodium silicate, the lithium silicate, the polysiloxane, and the ethanol. The composition may include the solvent in a range of 50 to 90 wt %. More solvent may be included, which may improve workability of the coating process and ease a thickness control of the coating layer upon manufacturing.

A Stainless Object of Member and a Method of Manufacturing the Same

The composition according to the present disclosure may be hardened on a surface of a target object to form a final stainless member or object. The target object may have a stainless steel surface, like an upper plate of a gas range inside a light wave oven. The coating layer may be formed with the composition, sprayed or otherwise applied to at least one stainless steel surface of the target object, and hardened.

A spray method or process may yield a uniform application of the coating layer, even when the target object is curved. As the composition may include polysiloxane and ethanol to enhance leveling performance the target object, the coating layer may be coated uniformly and smoothly.

Figure 4:
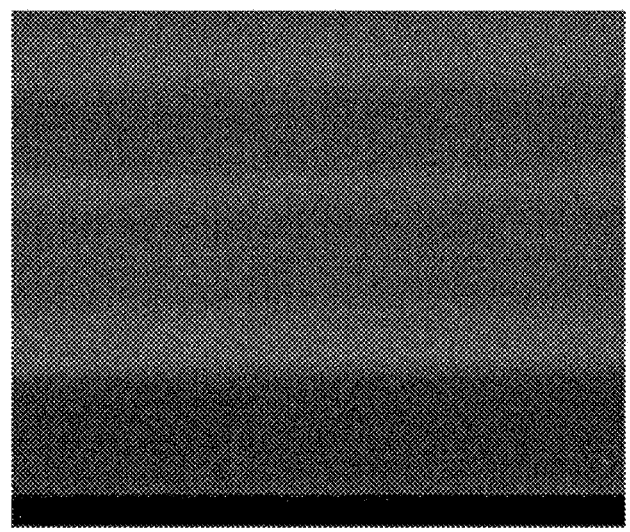
FIG. 4 is a scanning electron microscope (SEM) image of a stainless steel surface coated with a coating layer having a composition according to a first example (Example 1)
Figure 5:
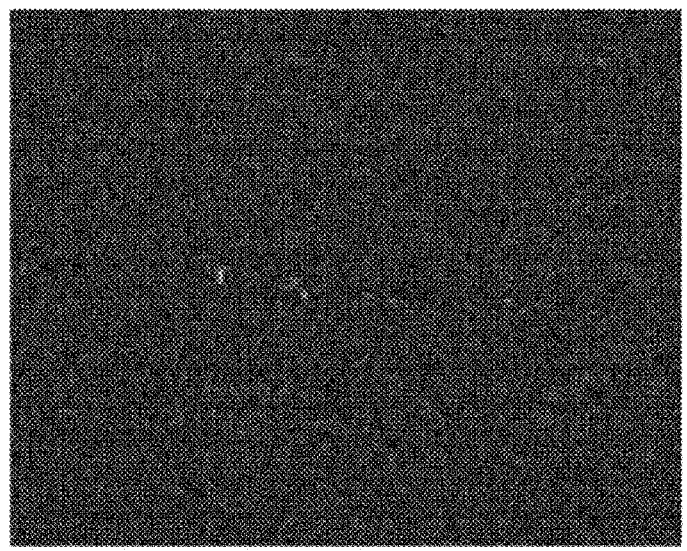
FIG. 5 is an atomic force microscope (AFM) image of a stainless surface coated with a coating layer having the composition of Example 1.

FIG. 4 is a scanning electron microscope (SEM) image of a coating layer according to the present disclosure applied to stainless steel surface using a spray method. FIG. 5 is an atomic force microscope (AFM) image of the sprayed on coating layer of FIG. 4. FIG. 4 shows a smooth and dense structure. The roughness of the coating layer shown in FIG. 5 and measured by the AFM is about 20.1 nm, which is fairly uniform.

EXAMPLES

Manufacturing of the Stainless Member

Compositions having the ratios described in Table 1 below were prepared. Although embodiments disclosed herein are not limited, as indicated in the Table, an amount of sodium silicate was in the range of approximately 13.52-15.41 wt %, an amount of lithium silicate was in the range of 1.25-12.31 wt %, an amount of polysiloxane was approximately 0.5 wt % (in the range of 0.49-0.51 wt %), and an amount of ethanol was in the range of 1.25-1.33 wt %. Each composition was sprayed on a stainless steel surface using a corona discharge gun and was hardened in a temperature range of about 450° C. to 500° C. for 350 to 400 seconds. Finally, a final stainless member or object was prepared for each of the compositions. In Comparative Example 1, no coating layer was formed. As indicated in Comparative Example 2, lithium silicate was included in an amount that exceeded 20 wt % (21.34 wt %).

TABLE 1

| Component (wt %) | Example 1 | Example 2 | Example 3 | Comparative example 1 | Comparative example 2 |
|---|---|---|---|---|---|
| Sodium Silicate | 13.52 | 14.56 | 15.41 | — | 18.56 |
| Lithium Silicate | 11.25 | 12.31 | 11.21 | — | 21.34 |
| Polysiloxane | 0.51 | 0.49 | 0.50 | — | — |
| Ethanol | 1.25 | 1.57 | 1.33 | — | — |
| Distilled water | Bal. | Bal. | Bal. | — | Bal. |

EXPERIMENTAL EXAMPLE

The final stainless members were evaluated, which is described in Table 4.

1. Evaluation of Cleaning Performance

A method of measuring cleaning performance includes spreading 1 g of olive oil with a brush on the final stainless member. Then, the final stainless member was put into an oven or other hot chamber so as to be exposed to 260° C. for 30 minutes to encourage contaminants to adhere to the final stainless member. A similar process includes spreading chicken's oil and again heating the first stainless member at 260° C. for 30 minutes.

Afterward, contaminants were wiped with about 3 kgf of a force using a wet cloth. A number of wipes, or a wipe reciprocation, was measured and defined as a "cleaning reciprocation". An index of cleaning performance is described in Table 2. An increased number of wipes required to remove the contaminants indicates a decreased cleaning performance.

TABLE 2

| Cleaning Reciprocation | Cleaning Performance |
|---|---|
| 1~5 | Very excellent |
| 6~15 | Excellent |
| 16~25 | Average |
| 26~ | Insufficient |

2. Yellowing Evaluation

To evaluate yellowing, the final stainless members were put into a Q-panel ultraviolet (QUV) testing machine and were exposed to 0.72 watts per square meter (Q/m$^2$) of radiant quantity by using an ultraviolet (UV) lamp having an average wavelength of 313 nm at about 400° C. for one hour. Then, a color difference (ΔE) between before and after exposure was measured by using a color-difference meter.

The yellowing evaluation index is as follows: A color difference (ΔE) of two or less was considered "Suitable", while a of greater than two was considered "Unsuitable."

3. Durability Evaluation

Hardness of the final stainless members was measured and durability was evaluated using the pencil hardness test. A pencil was pushed or scratched onto the final stainless member at uniform pressure while maintain an angle of 45°, and the pencil mark left on the surface was evaluated and/or the hardness of the pencil pushed on the surface was measured by using a hardness testing machine (manufactured by Chungbuk Tech) in a load of 500 g. The pencil test was performed 5 times for each final stainless member, and Table 5 indicates the average pencil hardness value for each final stainless member.

According to the American Society for Testing and Materials (ASTM) 3363-74, a standard pencil (e.g., a Mitsubishi pencil) is changed from 6B to 9H while maintaining an angle of 45° when an untreated stainless steel surface is scratched, so a pencil hardness of 9H or more was considered "very excellent." The hardness or durability evaluation index is described in Table 3.

TABLE 3

| Pencil hardness | Durability |
|---|---|
| 9H or more | Very excellent |
| 7H or more to less than 9H | Excellent |
| 5H or more to less than 7H | Average |
| Less than 5H | Insufficient |

4. Evaluation of Boiling Water Resistance

Surface changes to the coating layer on the final stainless members were observed to evaluate boiling water resistance. A method of evaluating the surface changes includes soaking the final stainless members in boiling water of 100° C. for one hour and then exposing the final stainless members for 72 hours. After exposure, the existence/non-existence of cracks, peeling, or whitening of the final stainless members were evaluated with the naked eye.

An evaluation index of boiling water resistance is as follows: when there is nearly no change to the final stainless member, resistance was considered to be "Suitable," a small amount of cracks, peeling, or whitening was considered "Not bad," and a large amount of cracks, peeling, or whitening was considered "Unsuitable".

5. Evaluation of Spray Coating Suitability and/or Uniformity

The final stainless members were observed with the naked eye and also with a microscope (magnification of 175 times) to evaluate the suitability of the spray coating process used to apply the coating layers.

An evaluation index of suitability of the spray coating is as follows: a uniform spray appearance was considered "Suitable", while an ununiform appearance was considered "Unsuitable".

A summary of the results is shown in Table 4.

TABLE 4

| | Example 1 | Example 2 | Example 3 | Comparative example 1 | Comparative example 2 |
|---|---|---|---|---|---|
| Evaluation of cleaning performance (Olive oil) | Very excellent | Very excellent | Very excellent | Insufficient | Excellent |
| Evaluation of cleaning performance (Chicken's oil) | Very excellent | Very excellent | Very excellent | Insufficient | Very excellent |
| Evaluation of yellowing | Suitable | Suitable | Suitable | Unsuitable | Suitable |
| Evaluation of durability | Very excellent | Very excellent | Very excellent | Insufficient | Excellent |
| Evaluation of boiling water resistance | Suitable | Suitable | Suitable | — | Unsuitable |
| Evaluation of spray coating | Suitable | Suitable | Suitable | — | Unsuitable |

Figure 6:
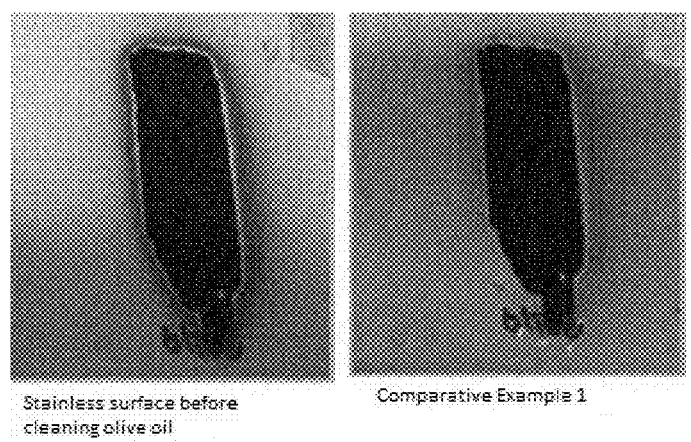
FIG. 6 shows before and after photos of an uncoated stainless steel surface according to a first comparative example 1 (Comparative Example 1) cleaned with olive oil.
Figure 7:
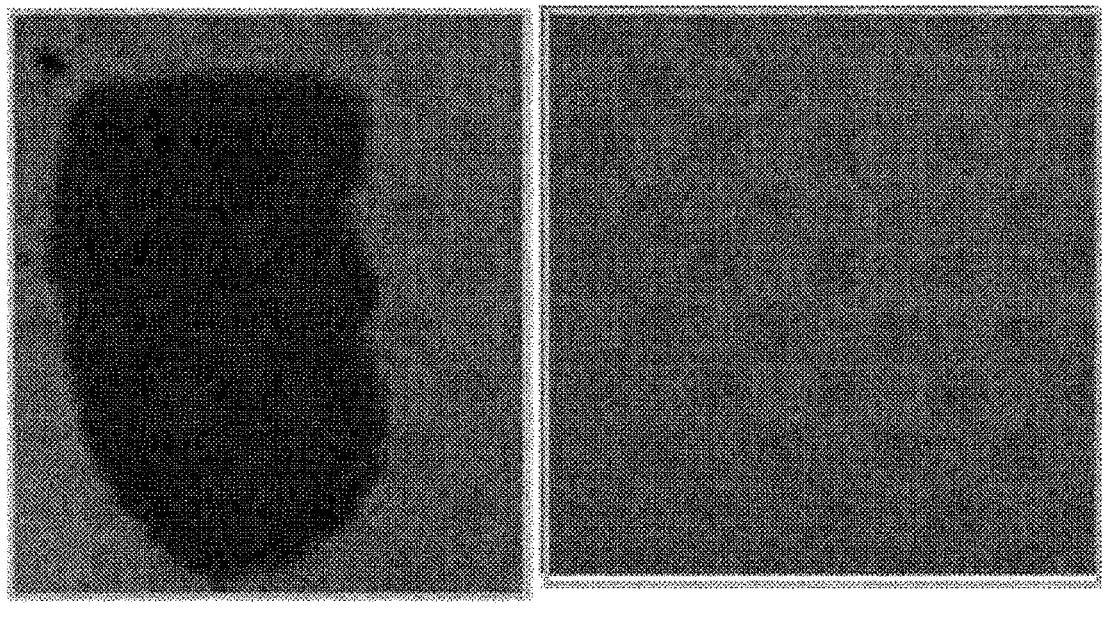
FIG. 7 shows before and after photos of a stainless steel surface coated with the coating layer having the composition of Example 1 cleaned with olive oil.

As shown in Table 4, cleaning performance against contaminants of the final stainless members made with the coating layers having the compositions of Examples 1 to 3 was very excellent compared to that of the uncoated final stainless member according to Comparative Example 1. Photos of before and after cleaning the olive oil contaminants from the final stainless members are shown in FIG. 6 (Comparative Example 1) and FIG. 7 (Example 1). As shown in FIG. 7, the olive oil contaminants were very easily and thoroughly removed from the final stainless member coated with the composition of Example 1 by a cleaning reciprocation of 5 or less.

Figure 8:
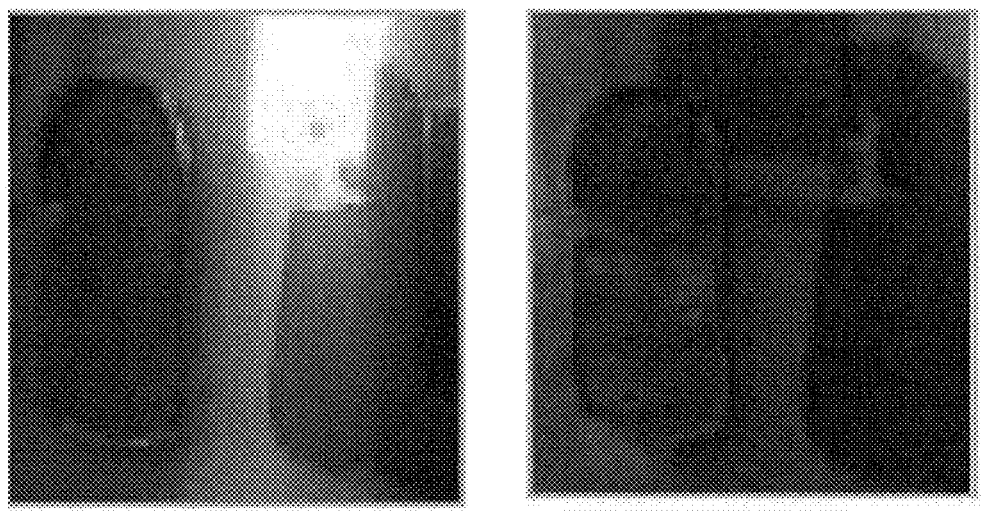
FIG. 8 shows before and after photos of the uncoated stainless surface of Comparative Example 1 cleaned with chicken's oil.
Figure 9:
FIG. 9 shows before and after photos of a stainless surface coated with the coating layer having the composition of Example 1 cleaned with chicken's oil.

Also, photos of before and after cleaning the chicken's oil contaminants from the final stainless members are shown in FIG. 8 (Comparative Example 1) and 9 (Example 1). As shown in FIG. 9, the chicken's oil contaminants were easily and fairly thoroughly removed from the final stainless member coated with the composition of Example 1 by a cleaning reciprocation of 5 or less times.

Figure 10:
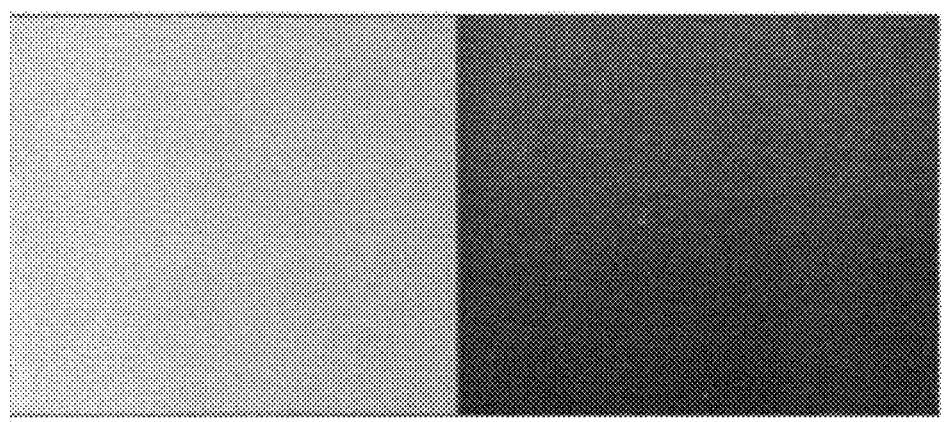
FIG. 10 shows photos of a stainless steel surface coated with the coating layer having the composition of Example 1 and an uncoated stainless surface according to Comparative Example 1 after being exposed to 400° C. for one hour.

As described in Table 4, there was nearly no yellowing of the final stainless members coated with the compositions of Examples 1 to 3 even when exposed to a high temperature. Photos of the final stainless members after being exposed to 400° C. for one hour are shown in FIG. 10. As shown in FIG. 10, nearly no yellowing occurs in the final stainless member coated with the composition of Example 1 as compared to the uncoated final stainless member according to Comparative Example 1.

Figure 11:
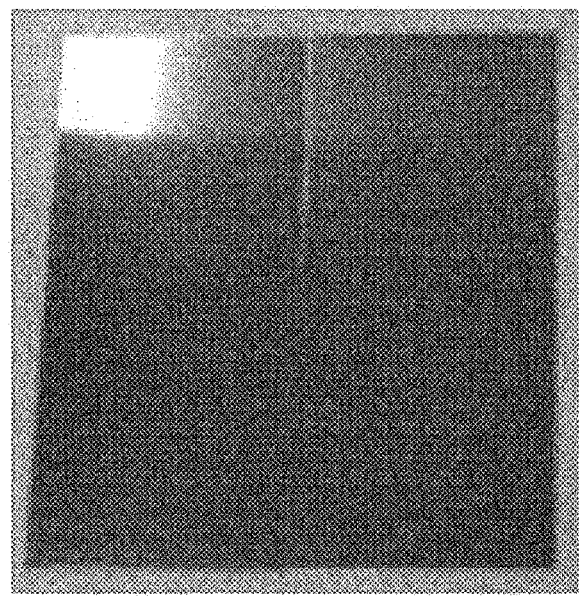
FIG. 11 is a photo after a stainless steel surface coated with a coating layer having the composition of Example 1 is exposed to a high temperature for a long time.

As described in Table 4, durability of the final stainless members coated with the compositions of Examples 1 to 3 is very excellent compared to that of the uncoated final stainless member according to Comparative Example 1. As further described in Table 4, after being exposed to boiling water, there is nearly no change in appearance or physical state of the final stainless members coated with the Compositions of Examples 1 to 3 compared to that of the stainless member coated with the composition of Comparative Example 2, so boiling water resistance is very excellent for the final stainless members of Examples 1-3. As shown in FIG. 11, there were no cracks, peeling, or whitening in the final stainless member coated with the composition of Example 1 after testing boiling water resistance.

Figure 12:
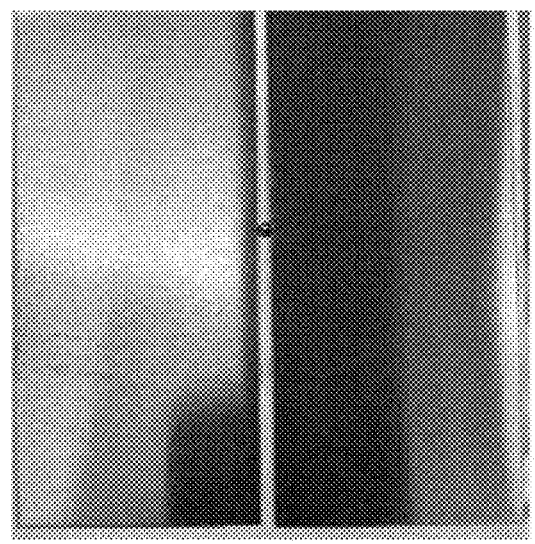
FIG. 12 shows photos of a stainless steel surface spray coated with a coating layer having the composition of Example 1.
Figure 13:
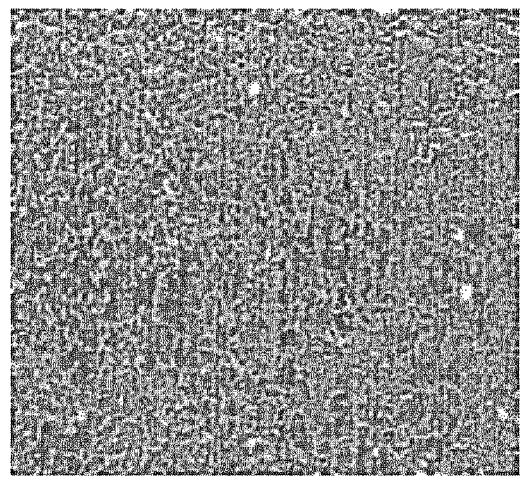
FIG. 13 is a photo of a stainless steel surface spray coated with a coating layer having a composition according to a second comparative example (Comparative Example 2).

As described in Table 4, the final stainless members coated with the compositions of Examples 1 to 3 were uniformly coated compared to the final stainless member coated with the composition of Comparative Example 2. As shown in FIG. 12, the final stainless member coated with the Composition of Example 1 exhibited a uniform and smooth surface under a microscope, in addition to the naked eye. As shown in FIG. 13, the final stainless member coated with the composition of Comparative Example 2 is ununiform and very rough. The composition of Example 1 exhibits high leveling performance compared to the composition of Comparative Example 2, so the composition of Example 1 may be uniformly and smoothly coated in a spray process as compared to the composition of Comparative Example 2.

Compositions of Examples 1-3 included an amount of sodium silicate in the range of about 13-16 weight percent (wt %) (13.5-14.5 wt %, or 13.52-15.41 wt %), an amount of lithium silicate in the range of about 11-13 wt % (11.2-12.5 wt %, or 11.25-12.31 wt %), an amount of polysiloxane in a range of about 0.4-0.6 wt % (0.45-0.55 wt %, 0.49-0.51 wt %, or roughly 0.5 wt %), and an amount of ethanol in a range of about 1-2 wt % (1.2-1.6 wt %, or 1.25-1.57 wt %).

Embodiments disclosed herein may provide a composition for a stainless or protective coating (or a coating layer), a coating layer including the composition, a stainless member including the coating layer, and a method of manufacturing the same. Contaminants may be easily removed from the final stainless surface of the stainless member. Even though the stainless member may be exposed to a high temperature for a long time, yellowing may be prevented. Moisture resistance of the stainless member may be improved, surface changes and whitening may be reduced or prevented, and hardness of the surface may be enhanced at the same time. An object to be coated may be coated uniformly and smoothly with the coating layer to produce a uniform and smooth surface appearance.

Embodiments disclosed herein are not limited by the noted objective, as other objectives and advantages of the present disclosure which are not noted may be understood by the description and may be definitely understood by embodiments of the present disclosure. Also, it may be easily understood that objectives and advantages of the present disclosure may be realized by means described in the scope of claims and combinations thereof.

A composition for a stainless coating or coating layer may include a sodium silicate, a lithium silicate, and a residual solvent produced by coating an object with the stainless coating so that contaminants of the stainless surface may be easily removed, moisture resistance of the surface may be improved, surface changes and whitening may be reduced or prevented, and hardness of the surface may be enhanced. Even when the surface is exposed to a high temperature for a long time yellowing may be reduced or prevented, and the surface may maintain a shining and clear appearance. Contaminants of the surface may be easily cleaned without excessive time consumption, moisture resistance of the surface may be improved, and durability may be enhanced.

The composition for the stainless coating may include a polysiloxane and ethanol so that the stainless surface may be uniformly and smoothly coated. Spreadability of the coating composition formed on the object may be excellent, leveling performance may be enhanced, and the coating composition may be uniformly and smoothly coated on even a curved surface.

Embodiments disclosed herein may be implemented as a composition for a stainless coating comprising 5 to 20 weight percent (wt %) of a sodium silicate, 3 to 20 wt % of a lithium silicate, and a remaining weight percentage including polysiloxane, ethanol and a residual solvent.

The sodium silicate may be included in an amount of 13-16 weight percent (wt %). The lithium silicate may be included in an amount of 11 to 13 wt %. The polysiloxane may be included in an amount that exceeds 0 wt % but is less than 1 wt %. The polysiloxane may be included an amount of 0.4-0.6 wt %. The ethanol may be included in an amount that exceeds 0 wt % but is less than 5 wt %. The ethanol may be included in an amount of 1-2 wt %.

The residual solvent may be distilled water. The residual solvent may be included in an amount of 50-90 wt %. A mole ratio of silicon dioxide to sodium oxide ($SiO_2/Na_2O$) of the sodium silicate may be in a range of 3.9 to 4.1, and the mole ratio of silicon dioxide to lithium oxide ($SiO_2/Li_2O$) of the lithium silicate may be in a range of 4.5 to 5.0.

Embodiments disclosed herein may be implemented as a stainless object or a stainless steel object coated with the stainless coating having the composition disclosed herein. The stainless steel object may be made of metal or stainless steel, but embodiments disclosed herein are not limited. The stainless steel object may be coated in (e.g., sprayed with) the stainless coating having the composition, and the stainless coating may be hardened.

Embodiments disclosed herein may be implemented as a method of coating the stainless object using the stainless coating having the composition disclosed herein. The method may include spraying the composition onto at least one surface of the stainless object and heating the sprayed stainless object.

Embodiments disclosed herein may be implemented as a coating layer comprising a composition including a residual solvent mixed with sodium silicate, lithium silicate, a polysiloxane, and ethanol, wherein the composition is configured to be sprayed onto a metallic surface and hardened at a prescribed temperature. After spraying, the coating layer may have a smooth and uniform texture and appearance.

The sodium silicate may be included in an amount of 5-20 weight percent (wt %). The lithium silicate may be included in an amount of 1-20 wt %. The polysiloxane may be included in an amount of less than 1 wt %. The ethanol may be included in an amount of less than 5 wt %.

The sodium silicate may be included in an amount of 13.5-14.5 wt %. The lithium silicate may be included in an amount of 11.2-12.5 wt %. The polysiloxane may be included in an amount of 0.45-0.55 wt %. The ethanol may be included in an amount of 1.2-1.6 wt %. After the coating layer is sprayed onto the metallic surface and hardened, a roughness may be about 20.1 nm.

In addition to the above effects, specific effects of the present disclosure may be described with explaining specific matters for implementing the present disclosure hereinafter. The present disclosure is described referring to exemplary drawings, but it is obvious that the present disclosure is not limited by the disclosed embodiments and drawings and various modifications may be made by one having ordinary skill in the art within the scope of the technical spirit of the disclosure. Further, even though action and effects according to configuration of the present disclosure are not definitely described in the description of embodiments of the present disclosure, it is certain that predictable effects resulted from the relevant configuration should be also admitted.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A composition for a stainless coating, comprising:
   13.5-14.5 weight percent (wt %) of a sodium silicate;
   11.2-12.5 wt % of a lithium silicate;
   0.45-0.55 wt % of a polysiloxane;
   1.2-1.6 wt % of an ethanol; and
   a remaining weight percentage including a residual solvent.

2. The composition of claim 1, wherein the residual solvent is distilled water.

3. The composition of claim 1, wherein the residual solvent is included in an amount of 50-90 wt %.

4. The composition of claim 1, wherein a mole ratio of silicon dioxide to sodium oxide ($SiO_2/Na_2O$) of the sodium silicate is in a range of 3.9 to 4.1, and the mole ratio of silicon dioxide to lithium oxide ($SiO_2/Li_2O$) of the lithium silicate is in a range of 4.5 to 5.0.

5. A stainless steel object coated with a stainless coating having the composition of claim 1, wherein the stainless steel object is made of stainless steel, coated in the stainless coating having the composition of claim 1, and the stainless coating is hardened.

6. A coating layer, comprising:
   a composition including a residual solvent mixed with sodium silicate, lithium silicate, a polysiloxane, and ethanol, wherein:
   the sodium silicate is included in an amount of 13.5-14.5 wt %;
   the lithium silicate is included in an amount of 11.2-12.5 wt %;
   the polysiloxane is included in an amount of 0.45-0.55 wt %; and
   the ethanol is included in an amount of 1.2-1.6 wt %.

7. The coating layer of claim 6, wherein, after the coating layer is sprayed onto the metallic surface and hardened, a roughness is about 20.1 nm.

* * * * *